(12) United States Patent
Sarkar et al.

(10) Patent No.: US 6,862,457 B1
(45) Date of Patent: Mar. 1, 2005

(54) METHOD AND APPARATUS FOR ADAPTIVE REVERSE LINK POWER CONTROL USING MOBILITY PROFILES

(75) Inventors: Sandip Sarkar, San Diego, CA (US); Yu-Cheun Jou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 385 days.

(21) Appl. No.: 09/598,526

(22) Filed: Jun. 21, 2000

(51) Int. Cl.[7] .................................................. H04B 7/00
(52) U.S. Cl. ....................... 455/522; 455/69; 455/226.1
(58) Field of Search ................................ 455/515, 67.3, 455/136, 226.3, 245.1, 522, 69

(56) References Cited

U.S. PATENT DOCUMENTS

| | | | |
|---|---|---|---|
| 5,574,747 A | | 11/1996 | Lomp |
| 5,963,870 A | | 10/1999 | Chheda et al. |
| 6,335,923 B2 | * | 1/2002 | Kubo et al. ................. 370/335 |
| 6,337,983 B1 | * | 1/2002 | Bonta et al. ................. 455/437 |
| 6,377,813 B1 | * | 4/2002 | Kansakoski et al. ........ 455/522 |
| 6,418,320 B2 | * | 7/2002 | Yoshida et al. ............. 455/522 |
| 6,434,130 B1 | * | 8/2002 | Soininen et al. ............ 370/331 |
| 6,512,931 B1 | * | 1/2003 | Kim et al. ................... 455/522 |
| 6,564,042 B1 | * | 5/2003 | Jou et al. ................. 455/238.1 |

FOREIGN PATENT DOCUMENTS

| | | | |
|---|---|---|---|
| WO | 00/33479 | 6/2000 | |
| WO | WO 00/33479 | * 6/2000 | ........... H04B/7/005 |

OTHER PUBLICATIONS

M.D. Austin et al. "Velocity Adaptive Handoff Algorithms for Microcellular Systems," International Conference on Universal Personal Communications, IEEE, New York, vol. 2, Oct. 12, 1993 (pp. 793–797).

* cited by examiner

*Primary Examiner*—Tilahun Gesesse
(74) *Attorney, Agent, or Firm*—Philip Wadsworth; Thien T. Nguyen; Kyong H. Macek

(57) ABSTRACT

A method and apparatus for adaptively controlling the power level of transmissions from a remote station by determining the velocity of the remote station. A general classification of the velocity of the remote station can be used to selectively implement a closed loop power control scheme. Power level parameters are used to determine velocity. In accordance with a classification of stationary, low speed, or high speed, the closed loop power control is selectively operated. Velocity can be determined by either the base station or the remote station through various methods. One method is the use of power control bits and/or average power to determine level crossings and excursion times.

14 Claims, 11 Drawing Sheets

METHOD AND APPARATUS FOR ADAPTIVE REVERSE LINK POWER CONTROL USING MOBILITY PROFILES

BACKGROUND

I. Field of the Invention

The present invention relates to wireless voice and data communication systems. More particularly, the present invention relates to a novel and improved method and apparatus for adaptively controlling power levels of data transmissions.

II. Description of the Related Art

The field of wireless communications has many applications including, e.g., cordless telephones, paging, wireless local loops, personal digital assistants (PDAs), Internet telephony, and satellite communication systems. A particularly important application is cellular telephone systems for mobile subscribers. (As used herein, the term "cellular" systems encompasses both cellular and personal communications services (PCS) frequencies.) Various over-the-air interfaces have been developed for such cellular telephone systems including, e.g., frequency division multiple access (FDMA), time division multiple access (TDMA), and code division multiple access (CDMA). In connection therewith, various domestic and international standards have been established including, e.g., Advanced Mobile Phone Service (AMPS), Global System for Mobile (GSM), and Interim Standard 95 (IS-95). In particular, IS-95 and its derivatives, IS-95A, IS95B, ANSI J-STD-008 (often referred to collectively herein as IS-95), and proposed high-data-rate systems for data, etc. are promulgated by the Telecommunication Industry Association (TIA) and other well known standards bodies.

Cellular telephone systems configured in accordance with the use of the IS-95 standard employ CDMA signal processing techniques to provide highly efficient and robust cellular telephone service. Exemplary cellular telephone systems configured substantially in accordance with the use of the IS-95 standard are described in U.S. Pat. Nos. 5,103,459 and 4,901,307, which are assigned to the assignee of the present invention and fully incorporated herein by reference. In CDMA systems, over-the-air power control is a vital issue. An exemplary method of power control in a CDMA system is described in U.S. Pat. No. 5,056,109, which is assigned to the assignee of the present invention and fully incorporated herein by reference.

A primary benefit of using a CDMA over-the-air interface is that communications are conducted over the same radio frequency (RF) band. For example, each remote subscriber unit (e.g., a cellular telephone, personal digital assistant (PDA), laptop connected to a cellular telephone, hands-free car kit, etc.) in a given cellular telephone system can communicate with the same base station by transmitting a reverse-link signal over the same 1.25 MHz of RF spectrum. Similarly, each base station in such a system can communicate with remote units by transmitting a forward-link signal over another 1.25 MHz of RF spectrum. Transmitting signals over the same RF spectrum provides various benefits including, e.g., an increase in the frequency reuse of a cellular telephone system and the ability to conduct soft handoff between two or more base stations. Increased frequency reuse allows a greater number of calls to be conducted over a given amount of spectrum. Soft handoff is a robust method of transitioning a remote unit from the coverage area of two or more base stations that involves simultaneously interfacing with two base stations. In contrast, hard handoff involves terminating the interface with a first base station before establishing the interface with a second base station. An exemplary-method of performing soft handoff is described in U.S. Pat. No. 5,267,261, which is assigned to the assignee of the present invention and fully incorporated herein by reference.

In conventional cellular telephone systems, a public switched telephone network (PSTN) (typically a telephone company) and a mobile switching center (MSC) communicate with one or more base station controllers (BSCs) over standardized E1 and/or T1 telephone lines (hereinafter referred to as E1/T1 lines). The BSCs communicate with base station transceiver subsystems (BTSs) (also referred to as either base stations or cell sites), and with each other, over a backhaul comprising E1/T1 lines. The BTSs communicate with remote units via RF signals sent over the air.

To provide increased capacity, the International Telecommunications Union recently requested the submission of proposed methods for providing high-rate data and high-quality speech services over wireless communication channels. The submissions describe so-called "third generation," or "3G," systems. An exemplary proposal, the cdma2000 ITU-R Radio Transmission Technology (RTT) Candidate Submission (referred to herein as cdma2000), was issued by the TIA. The standard for cdma2000 is given in draft versions of IS-2000 and has been approved by the TIA. The cdma2000 proposal is compatible with IS-95 systems in many ways.

The cdma2000 system uses a pilot channel and multiple traffic channels to carry voice and data services to subscribers. In order to optimize system performance on the reverse link between remote station and base station, pilot channel energies and traffic channel energies are balanced. Each channel is first spread with Walsh codes, which provides channelization and resistance to phase errors. A relative Walsh channel gain, $$F = \frac{P_{traffic}}{P_{pilot}},$$

is then added to the traffic channels in order to achieve a given Quality of Service (QoS). The optimal value for the Walsh channel gain is $$F_{opt} = \sqrt{\frac{R\gamma}{2B(1+r\gamma)}},$$

where R is the data rate, B is the channel estimator bandwidth and γ is the Signal-to-Noise Ratio (SNR) needed for a decoder to achieve a desired Frame Error Rate (FER) at data rate R. (It is implicit that coding and antenna diversity are also used to achieve the desired FER.) This gain gives the optimal tradeoff between spending more energy on the pilot channel for good channel estimation and reducing pilot overhead. In practice, a pilot power level high enough for path searching must be selected, making F lower than $F_{opt}$. In addition, for some traffic channels in the cdma2000 system, power control may be performed based on information derived from the pilot channel. In some instances when the transmission rates may be unknown to the base station, the pilot power must be kept constant over the transmission rates, since the base station will perform power control based solely upon information derived from the pilot channel.

The data rate, interleaver length, and coding type determine the power ratio discussed above, regardless of the Walsh channel used. For a given rate r bps, the signal to noise ratio per bit (Eb/No=β in dB) required to achieve the given QoS includes the total transmitted power, which includes the pilot. For a system with chip rate c cps, and a given pilot to traffic ratio=ρ dB, the energy per chip divided by the interference spectral density (Ec/Io=σ in dB) can be found as:

$$\sigma = 10\log_{10}\left(\frac{10^{\frac{(\beta+\rho)}{10}}}{1+10^{\frac{\rho}{10}}}\right) - 10\log_{10}\left(\frac{c}{r}\right).$$

It can be observed that the total amount of energy required to achieve a given QoS is dependent upon the velocity of the remote station. A method of estimating the power required to achieve a given QoS is described in U.S. application Ser. No. 09/519,004, entitled "VELOCITY ESTIMATION BASED GAIN TABLES," filed on Mar. 3, 2000, assigned to the assignee of the present invention, and fully incorporated herein by reference. In the absence of velocity estimation, there is no way to estimate the amount of power required to achieve a given QoS. As an example of this phenomena, FIG. 1 displays the relationship between the Pilot/Traffic Power Ratio and Eb/No for remote stations at different speeds. In this example, the cdma2000 reverse link is operated with two receive antennas (i.e. two paths) for carrier frequency $f_c$=2 GHz, chip rate=1.2288 MHz, data rate r=9600 bps, frame FER to vary widely. At a stationary position, represented by line 100, the Eb/No levels, which are required to achieve a 1% FER, range between 2 dB and 2.5 dB. However, for a moving vehicle, as represented by lines 101, 102 and 103, the Eb/No required to achieve the same 1% FER range between 3 and 3.5 dB. Hence, for a 9600 bps reverse link, the Eb/No required to achieve 1% FER varies widely, which leads to a sub-optimal system. There is a present need for an improvement that corrects the inefficiencies caused by the motion of a remote station.

SUMMARY

The present invention is directed to a novel and improved method and apparatus for adaptively controlling power levels in a wireless communication system by using the velocity of remote stations. The method comprises the steps of: determining a mobility profile of a remote station within the range of a base station, wherein the remote station transmits a plurality of signals to the base station by using an open loop power control scheme and a closed loop power control scheme; and turning off the closed loop power control scheme if the mobility profile is unfavorable. Hence, the method is advantageously directed toward a determination of power level statistics and the selective operation of the closed loop power control scheme in accordance with the power level statistics.

In an aspect of the invention, power level statistics advantageously include determinations of level crossings and excursions times, which are used to determine velocity classifications for the remote station.

In another aspect of the invention, determinations of level crossings and excursion times are advantageously used in an adaptive algorithm that predicts future velocity values of the remote station.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
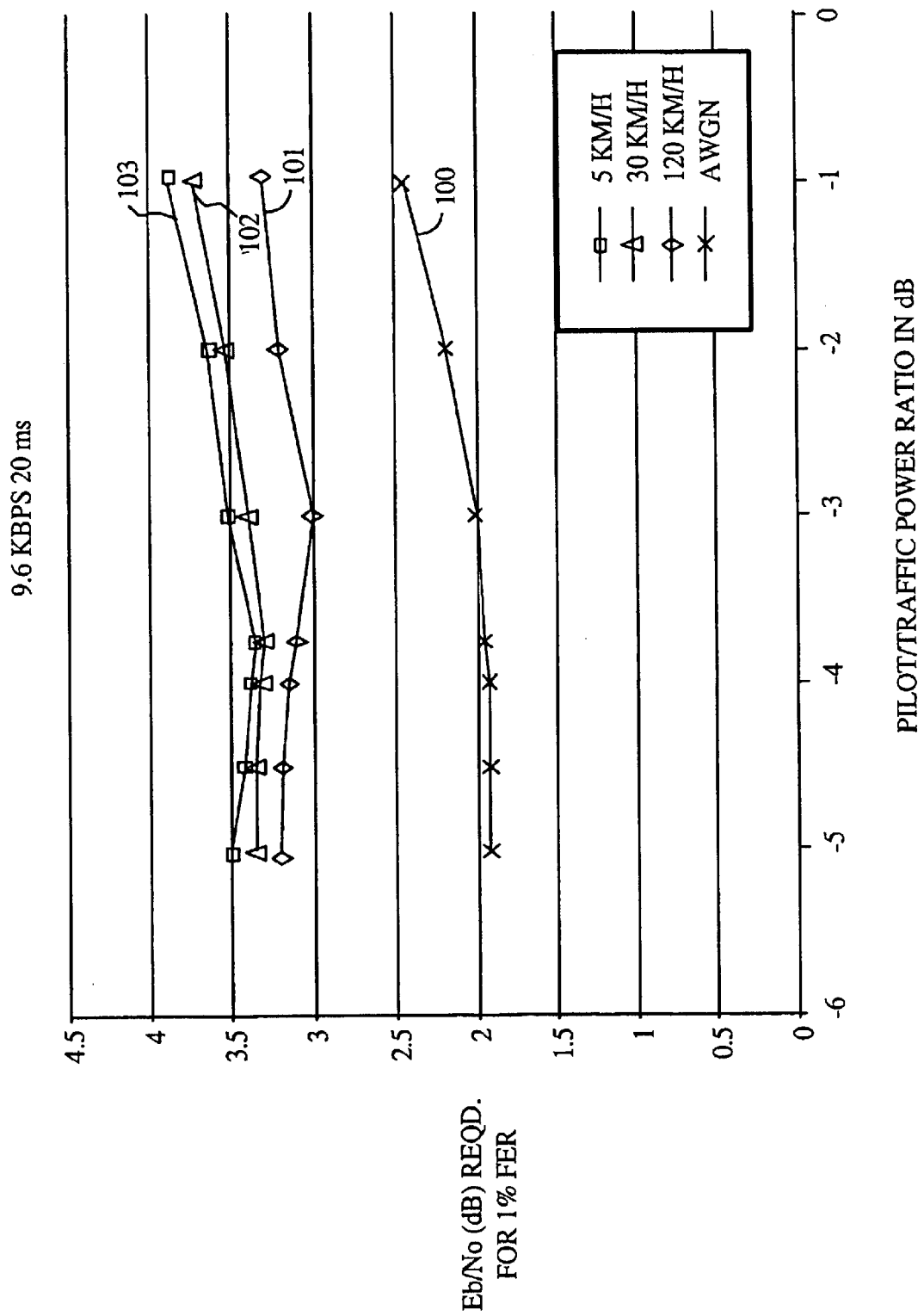
FIG. 1 is an illustrative graph of the Eb/No required to achieve 1% FER at various speeds.
Figure 2:
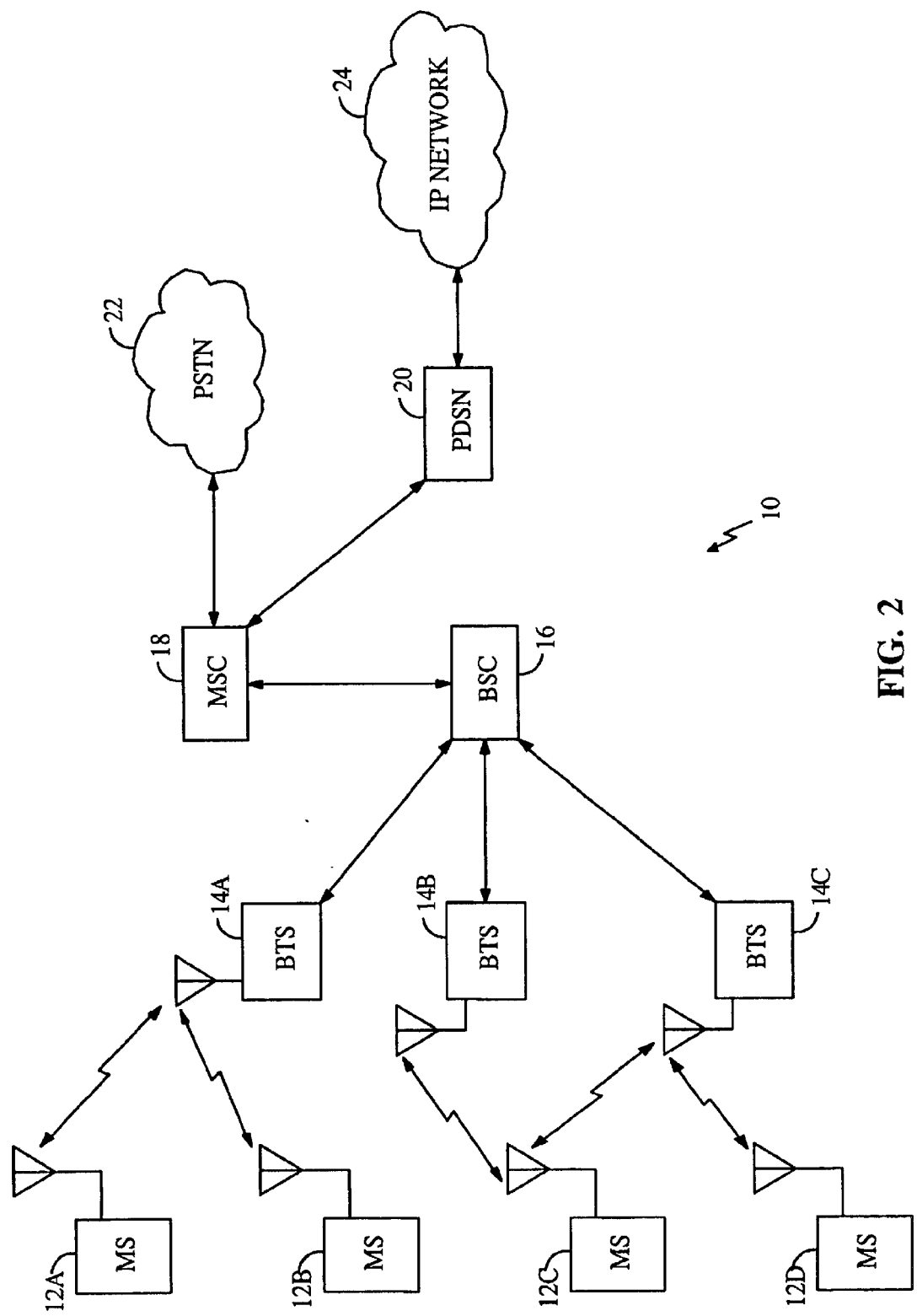
FIG. 2 is a diagram of an exemplary data communication system.

As illustrated in FIG. 2, a wireless communication network 10 generally includes a plurality of mobile stations or remote subscriber units 12a–12d, a plurality of base stations 14a–14c, a base station controller (BSC) or packet control function 16, a mobile station controller (MSC) or switch 18, a packet data serving node (PDSN) or internetworking function (IWF) 20, a public switched telephone network (PSTN) 22 (typically a telephone company), and an Internet Protocol (IP) network 24 (typically the Internet). For purposes of simplicity, four remote stations 12a–12d, three base stations 14a–14c, one BSC 16, one MSC 18, and one PDSN 20 are shown. It would be understood by those skilled in the art that there could be any number of remote stations 12, base stations 14, BSCs 16, MSCs 18, and PDSNs 20.

In one embodiment the wireless communication network 10 is a packet data services network. The remote stations 12a–12d may be cellular telephones, cellular telephones connected to laptop computers running IP-based, Web-browser applications, cellular telephones with associated hands-free car kits, or PDAs running IP-based, Web-browser applications. The remote stations 12a–12d may advantageously be configured to perform one or more wireless packet data protocols such as described in, e.g., the EIA/TIA/IS707 standard. In a particular embodiment, the remote stations 12a–12d generate IP packets destined for the IP network 24 and encapsulate the IP packets into frames using a point-to-point protocol (PPP).

In one embodiment the IP network 24 is coupled to the PDSN 20, the PDSN 20 is coupled to the MSC 18, the MSC is coupled to the BSC 16 and the PSTN 22, and the BSC 16 is coupled to the base stations 14a–14c via wirelines configured for transmission of voice and/or data packets in accordance with any of several known protocols including, e.g., E1, T1, Asynchronous Transfer Mode (ATM), IP, PPP, Frame Relay, HDSL, ADSL, or xDSL. In an alternate embodiment, the BSC 16 is coupled directly to the PDSN 20, and the MSC 18 is not coupled to the PDSN 20. In one embodiment the remote stations 12a–12d communicate with the base stations 14a–14c over an RF interface defined in $3^{rd}$ *Generation Partnership Project 2 "3GPP2", "Physical Layer Standard for cdma2000 Spread Spectrum Systems,"* 3GPP2 Document No. C.P0002-A, TIA PN-4694, to be published as TIA/EIA/IS-2000-2-A, (Draft, edit version 30) (Nov. 19, 1999), which is fully incorporated herein by reference.

During typical operation of the wireless communication network 10, the base stations 14a–14c receive and demodulate sets of reverse-link signals from various remote stations 12a–12d engaged in telephone calls, Web browsing, or other data communications. Each reverse-link signal received by a given base station 14a–14c is processed within that base station 14a–14c. Each base station 14a–14c may communicate with a plurality of remote stations 12a–12d by modulating and transmitting sets of forward-link signals to the remote stations 12a–12d. For example, the base station 14a communicates with first and second remote stations 12a, 12b simultaneously, and the base station 14c communicates with third and fourth remote stations 12c, 12d simultaneously. The resulting packets are forwarded to the BSC 16, which provides call resource allocation and mobility management functionality including the orchestration of soft handoffs of a call for a particular remote station 12a–12d from one base station 14a–14c to another base station 14a–14c. For example, a remote station 12c is communicating with two base stations 14b, 14c simultaneously. Eventually, when the remote station 12c moves far enough away from one of the base stations 14c, the call will be handed off to the other base station 14b.

If the transmission is a conventional telephone call, the BSC 16 will route the received data to the MSC 18, which provides additional routing services for interface with the PSTN 22. If the transmission is a packet-based transmission such as a data call destined for the IP network 24, the MSC 18 will route the data packets to the PDSN 20, which will send the packets to the IP network 24. Alternatively, the BSC 16 will route the packets directly to the PDSN 20, which sends the packets to the IP network 24.

Reverse channels are transmissions from remote stations 12a–12d to base stations 14a–14c. Performance of reverse link transmissions can be measured as a ratio between the energy levels of the pilot channel and other reverse traffic channels. A pilot channel accompanies the traffic channels in order to provide coherent demodulation of the received traffic channels. In the cdma2000 system, the reverse traffic channels can comprise multiple channels, including but not limited to an Access Channel, an Enhanced Access Channel, a Reverse Common Control Channel, a Reverse Dedicated Control Channel, a Reverse Fundamental Channel, a Reverse Supplemental Channel, and a Reverse Supplemental Code Channel, as specified by radio configurations of each individual subscriber network using cdma2000.

Although the signals transmitted by different remote stations within the range of a base station are not orthogonal, the different channels transmitted by a given remote station are mutually orthogonal by the use of orthogonal Walsh Codes. Each channel is first spread using a Walsh code, which provides for channelization and for resistance to phase errors in the receiver.

As mentioned previously, power control is a vital issue in CDMA systems. In a typical CDMA system, a base station punctures power control bits into transmissions transmitted to each remote station within the range of the base station.

Using the power control bits, a remote station can advantageously adjust the signal strength of its transmissions so that power consumption and interference with other remote stations may be reduced. In this manner, the power of each individual remote station in the range of a base station is approximately the same, which allows for maximum system capacity. The remote stations are provided with at least two means for output power adjustment. One is an open loop estimation process performed by the remote station and another is a closed loop correction process involving both the remote station and the base station.

In an open loop power control scheme, the receipt of a valid power control bit will incrementally increase or decrease the mean output value of a remote station by a predetermined amount. In a cdma2000 system, the incremental step size for valid power control bits is 1 dB. Hence, if a "0" is received, the power level of a transmission is reduced by 1 dB. If a "1" is received, the power level of a transmission is increased by 1 dB. In another implementation, the magnitude of the output power level changes can be determined by the magnitude of the input power level changes. However, the open loop power control scheme is slow and cannot follow fading conditions well. A need for modification of the transmission power level may be indicated when channel conditions change rapidly. To satisfy this need, the final output value of the open loop power control scheme is usually adjusted by a closed loop power control scheme, wherein the receipt of a valid closed loop power control bit will change the mean output power level of the remote station by an amount within a predetermined range around the value determined by the open loop power control scheme. The closed loop power control scheme is used to adjust the transmit power to suit changing channel conditions and to optimize the performance of the reverse link.

Extensive simulations on the performance of the reverse link have been conducted that reveal a problem regarding the implementation of a closed loop power control scheme. In some observable instances, the closed loop power control scheme does not provide any benefit to the open loop power control scheme, and actually hurts the reverse link performance of the system.

Figure 3A:
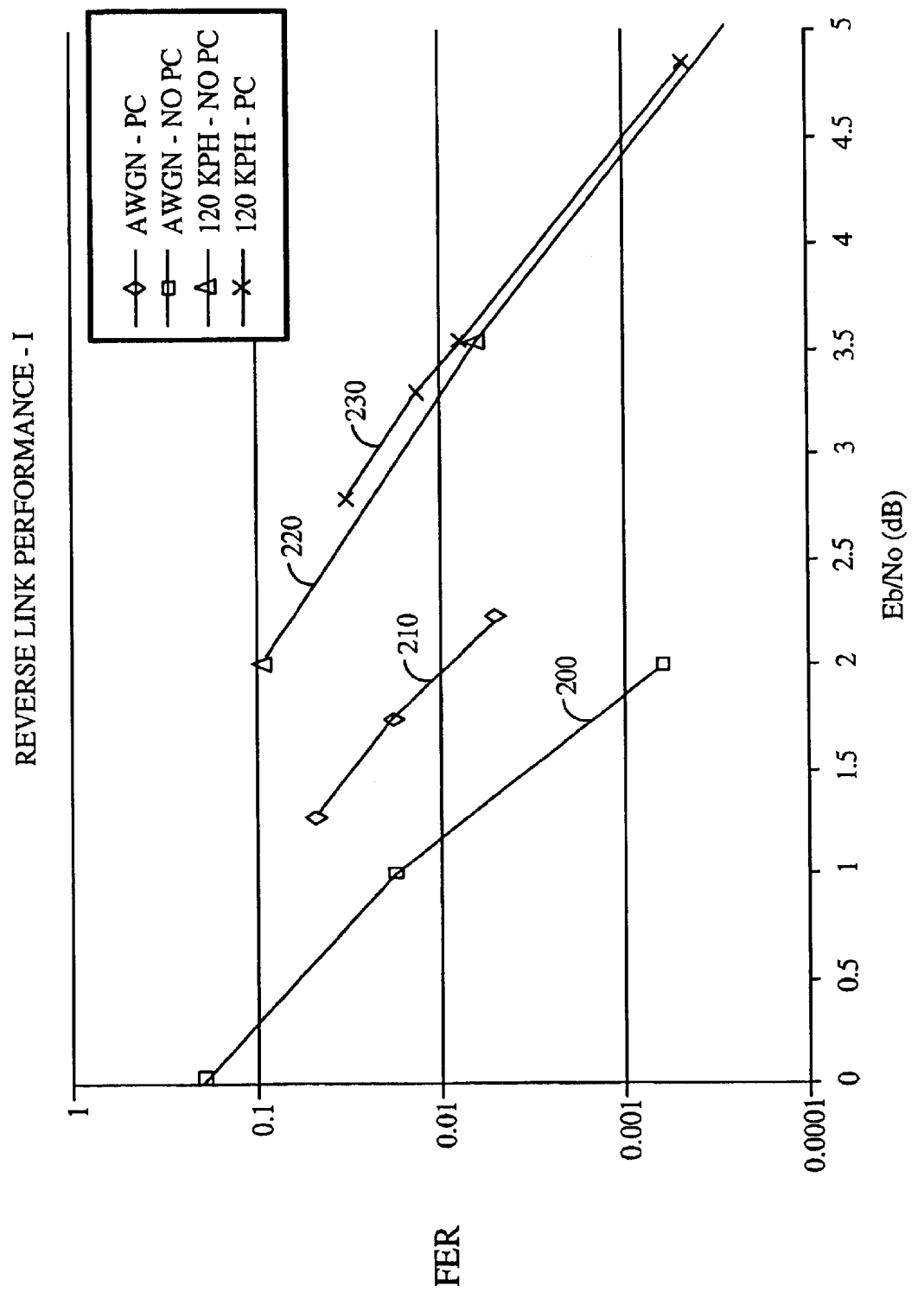
FIG. 3a is a comparison graph of ineffective power control regions.

FIG. 3a is a graph illustrating the relationship between the Frame Error Rate (FER) and the signal to noise ratio per bit (Eb/No) at a stationary speed and at a high speed, each illustrated with and without the use of a closed loop power control scheme. A stationary remote station can be modeled with an Additive White Gaussian Noise (AWGN) channel since the received signal from a static remote station can be thought of as a signal corrupted by AWGN. It will herein be labeled as such in the accompanying figures. Line 200 represents the performance of a stationary remote station without using a closed loop power control scheme. Line 210 represents the performance of a stationary remote station while using a closed loop power control scheme. Line 220 represents the performance of a remote station travelling at high speeds without using a closed loop power control scheme. Line 230 represents the performance of a remote station travelling at high speeds while using a closed loop power control scheme. It can be observed that at high speeds and for static cases, the implementation of a closed loop power control scheme does not benefit the performance of the system. In the high speed case, the closed loop power control scheme does not aid or hurt the performance of the system. However, in the AWGN case, the closed loop power control scheme hurts the performance of the system by increasing the FER at a designated point. For example, at 2 dB, the FER is worsened by a factor of approximately 10.

Figure 3B:
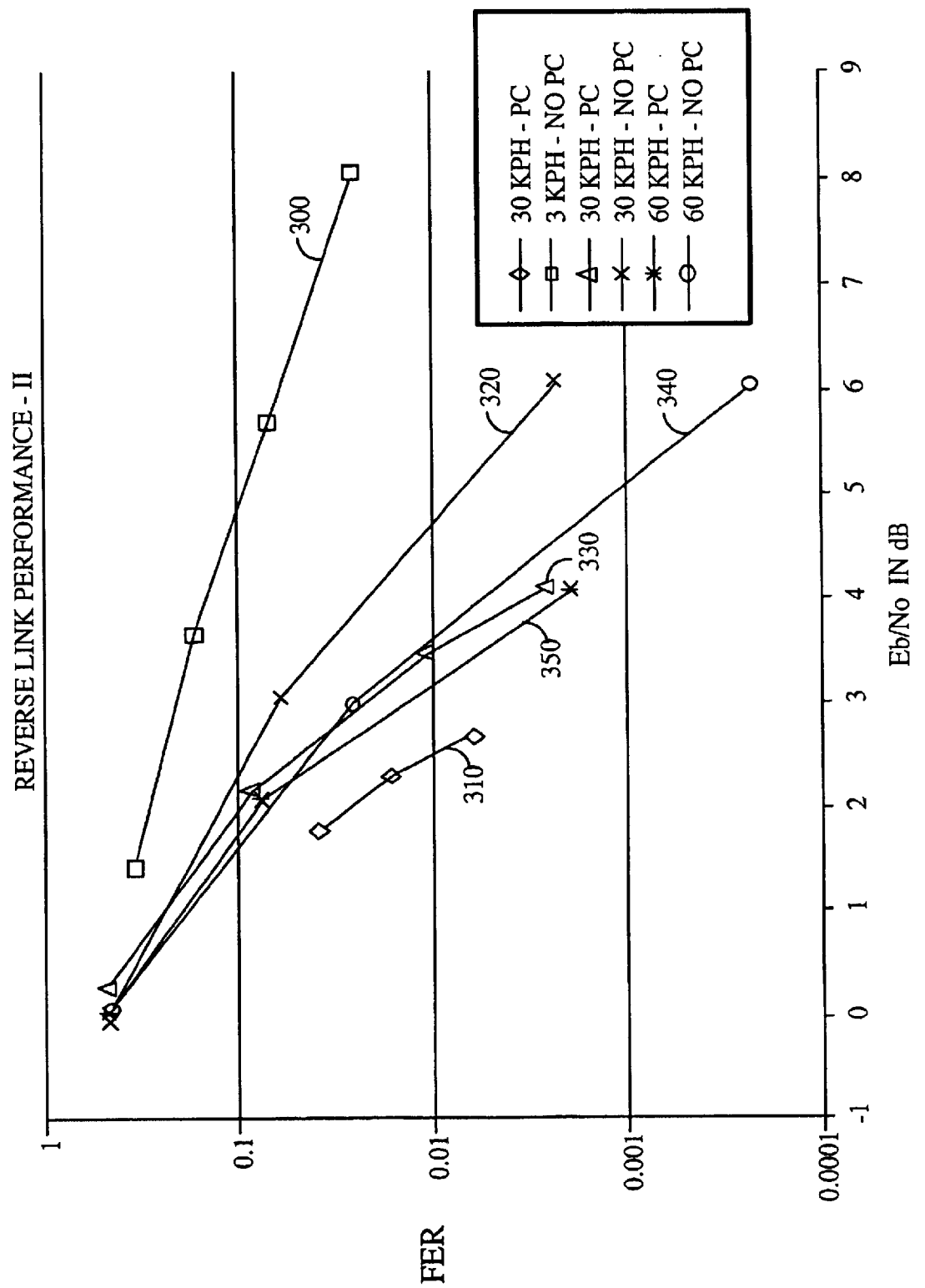
FIG. 3b is a comparison graph of effective power control regions.

FIG. 3b is a graph illustrating the relationship between FER and Eb/No at various low speeds, wherein each speed is represented with and without the use of a closed loop power control scheme. Line 300 represents the performance of a very slow remote station without a closed loop power control scheme. Line 310 represents the performance of a very slow remote station with a closed loop power control scheme. Observing lines 300 and 310, the use of a closed loop power control scheme provides an improvement in the performance of the system that is observed to be quite large. For example, to achieve an FER of 0.05%, a system using a closed loop power control scheme would require 2 dB. However, a system that does not use a closed loop power control scheme would require approximately 8 dB in order to achieve an FER of 0.05%.

Line 320 represents the performance of the remote station travelling at a low speed without using a closed loop power control scheme. Line 330 represents the performance of the remote station travelling at a low speed while using a closed loop power control scheme. It can be observed that at a low speed, the implementation of a closed loop power control scheme provides a lower FER for most Eb/No values. Line 340 represents the performance of the remote station travelling at a medium speed without using a closed loop power control scheme. Line 350 represents the performance of the remote station travelling at a medium speed while using a closed loop power control scheme. It can be observed that at a medium speed, the implementation of a closed loop power control scheme provides a lower FER for most Eb/No values.

An evaluation of FIG. 3a and FIG. 3b presents the problem of the inefficient utilization of the closed loop power control scheme in a multi-channel, wireless communication system. The presently disclosed embodiments are directed toward a method and apparatus that advantageously utilizes the closed loop power control scheme to optimize the performance of a wireless communication system.

Figure 4:
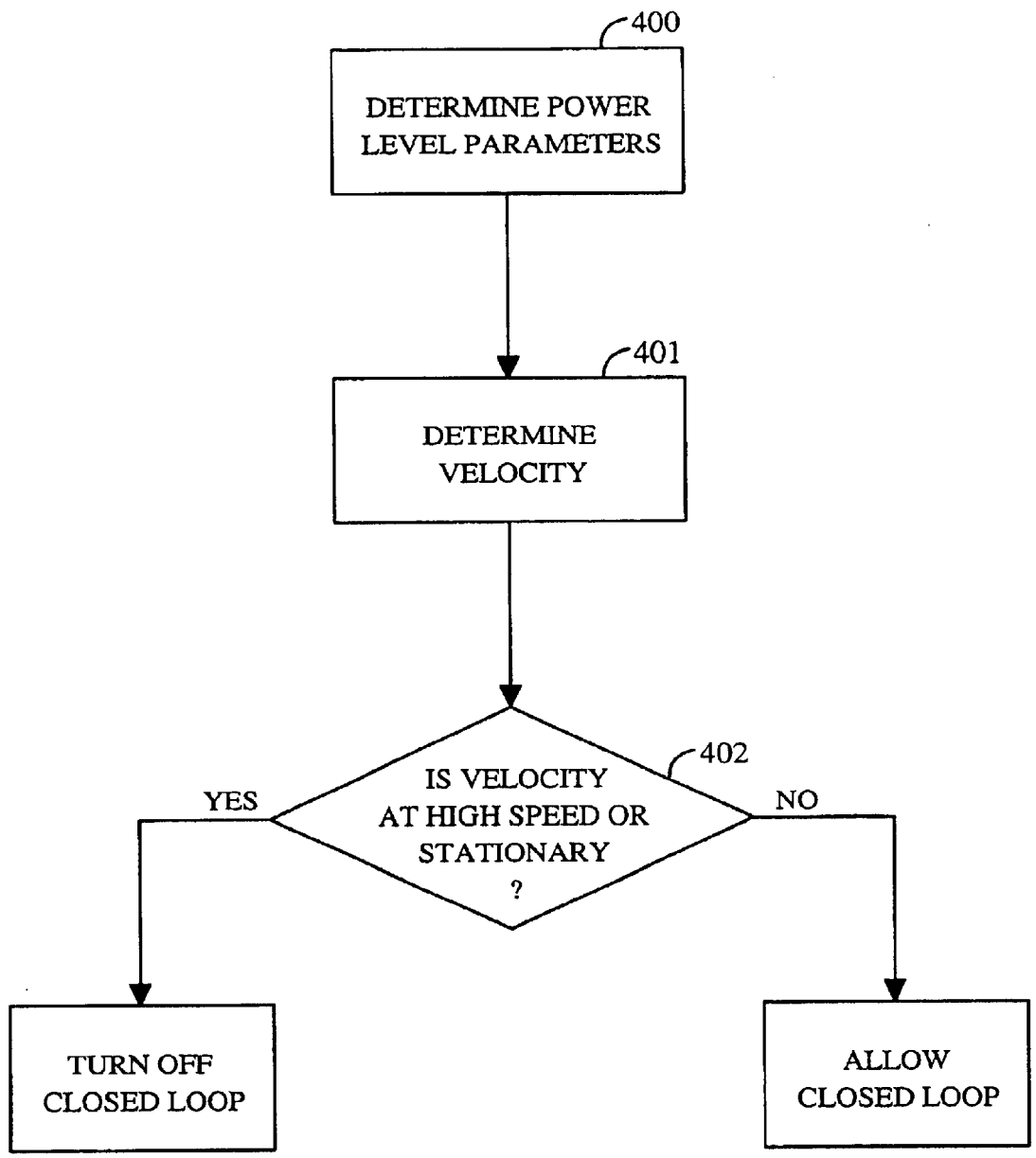
FIG. 4 is a flow chart of an adaptive power control method.

FIG. 4 shows a flow chart illustrating an exemplary embodiment of the invention that pertains to a method for controlling the operability of the closed loop power control scheme to benefit the performance of the reverse link. For illustrative purposes, the method herein described shall be performed at the base station, but it should be noted that the various method steps of the embodiment may be performed at either the remote station or the base station. At step 400, a set of signal parameters are determined at the base station from the received signal. Control flow then proceeds to step 401. At step 401, the base station uses the set of signal parameters to estimate the velocity of the remote station. If the velocity estimate indicates that the remote station is travelling at a high speed or is at a stationary position at step 402, the base station proceeds to turn off the closed loop power control scheme, either by refraining from sending valid power control bits or by transmitting a command to the remote station, which turns off the closed loop power control scheme upon receipt of the command. A base station operating in accordance with the cdma2000 system has the flexibility to turn off power control schemes. If the velocity estimate indicates that the remote station is travelling at low speeds, then the closed loop power control scheme is implemented. For illustrative purposes, the classification of a velocity value as high speed occurs when the remote station is travelling at over 100 km/hour. But other speed limits may be selected for use in the embodiment in accordance with individual system parameters. For this embodiment, a stationary classification is set for 0 km/hour and a low speed classification is set for values between 0 km/hour and 100 km/hour. The method described in FIG. 4 can be advantageously implemented using a processor, a memory, and an instruction module executable by the processor, or with other equivalent forms of hardware and/or software.

In one aspect of the exemplary embodiment, a velocity estimation scheme, as described in U.S. Pat. No. 6,564,042, entitled, "Velocity Estimation Based Gain Tables," filed on Mar. 3, 2000, issued on May 13, 2003 to Jou et al. and incorporated by reference herein and assigned to the assignee of the present invention, can be used at step 401 to determine the velocity of the remote station. A general observation is that during instances of fast fading conditions, the received pilot power will cross a given power level threshold faster. The envelope level crossing rate (LCR) is defined as the average number of positive crossings across a predetermined level, R, per second. In one implementation of the embodiment, the level crossing velocity estimation technique is applied to either the in-phase (I) component or the quadrature (Q) component of the signal using a zero crossing rate (ZCR).

Let $\lambda_c$ be the carrier wavelength, then:

$$\hat{v}_{LCR} \approx \frac{\lambda_c \hat{L}_{R_{RMS}} e}{\sqrt{2\pi}}, \text{ or } \hat{v}_{ZCR} \approx \frac{\lambda_c \hat{L}_{ZCR}}{\sqrt{2}},$$

in which $\hat{L}_{R_{RMS}}$ is the number of level crossings per second, $\hat{L}_{ZCR}$ is the number of zero crossings (times the signal crosses zero), and e is the constant that is the base for the natural logarithm (ln). Then $\hat{v}_{LCR}$ is the estimated velocity using level crossings and $\hat{v}_{ZCR}$ is the estimated velocity using zero crossings.

In another aspect of the exemplary embodiment, the velocity of the remote station can be determined through covariance estimation. An estimate is made of the auto-covariance between faded samples r[i]. The faded samples r[i] may be the envelope samples, the squared-envelope samples, or the log-envelope samples. The value $\tau_r$ is defined as the samples spacing in units of seconds per sample. The value $\mu_{rr}(0)$ is defined as the energy of the received signal r[k] ($\mu_{rr}(k)$ being the covariance). For the squared envelope, the velocity of the remote station may be estimated in accordance with the following equation:

$$\hat{v}_{COV} \approx \frac{\lambda_C}{2\pi \tau_t} \sqrt{\frac{\overline{V}}{\mu_{rr}(0)}},$$

where $$V = \frac{1}{N}\sum_{k=1}^{N}(r[k+\tau_t] - r[k])^2,$$

k is the sample index, N is a moving window size, and $\overline{V}$ is an average value of V. The signal energy, $\mu_{rr}(0)$, may be estimated in accordance with a number of methods known to those of skill in the art.

In another aspect of the exemplary embodiment, the velocity of the remote station can be determined through Doppler frequency estimation, which is proportional to the velocity of the remote station. Doppler estimation can also be performed using knowledge of the transmitted power control bits, at either the remote station or the base station.

In one implementation of the embodiment, the power control bits are advantageously used to estimate the channel conditions. Through observation, it is determined that power control bits are received by the remote station with a 4% error rate. Hence the transmission power levels of the remote station and the transmission power levels indicated by the actual power control bits only differ by approximately 4%. This information indicates that it is reasonable to make a transmission power level estimate either by using a number of power control bits received by the remote station or by using a number of power control bits transmitted by the base station.

Knowledge of the cumulative sum of the power control bits can be used by the base station or the remote station to determine the average power of the remote station's transmissions, which can in turn be used to determine the velocity of the remote station. The power levels of the received signals are used to determine the envelope level crossing rate (LCR), excursion times, and excursion depths. This determination is made through direct observation of the number of positive going crossings per second made by the transmitted power control bits. In turn, the level crossing rate and the excursion time can be used to determine velocity information. It should be noted that the profile of the envelope LCR is similar to the transmit power profile of the remote station. In an embodiment, the power profile of the remote station, which is composed of 1 dB incremental steps, may be replaced by the profile of the envelope LCR, which can be smoothed by taking a geometric mean of successive powers of the received waveform energy per PCG and curve fitting the values.

Figure 5:
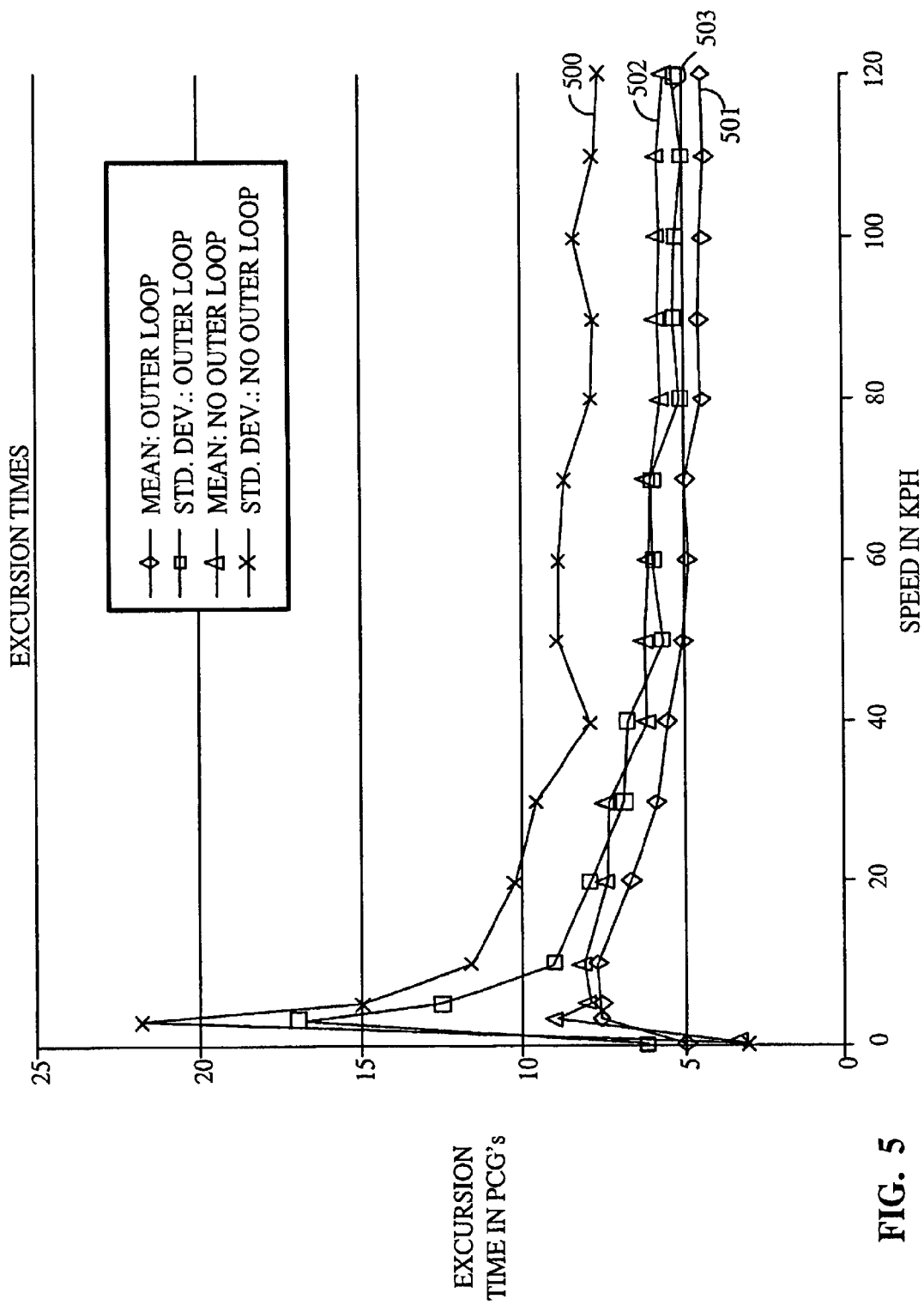
FIG. 5 is an illustrative graph of the Excursion Time in PCGs vs. Speed.
Figure 6:
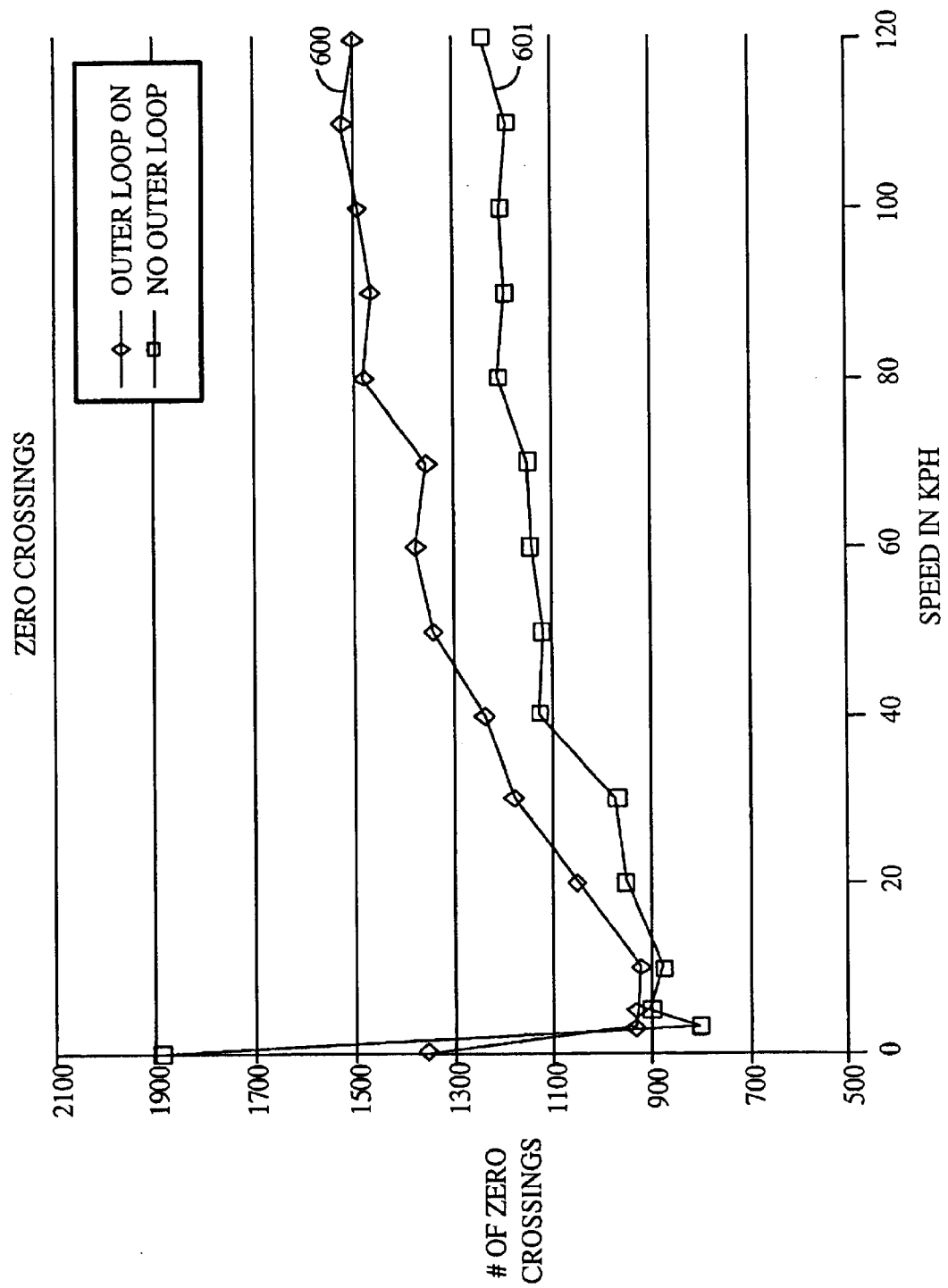
FIG. 6 is an illustrative graph of the Number of Zero Crossings vs. Speed.

FIG. 5 and FIG. 6 are graphs representing simulations, wherein the closed loop power control scheme was used to achieve a 1% FER or a fixed threshold was used to achieve a 1% FER, whereupon the closed loop power control scheme was not used. A fixed threshold is based on the total amount of energy transmitted per frame. One power control bit was sent every 1.25 ms, for a rate of 800 Hz, and is referred to as a power control group (PCG). The level crossings were counted with respect to the setpoint for 500 frames, at 20 ms/frame, which results in 8000 PCGs. Excursion times are measured in units of PCGs. FIG. 5 is a graph illustrating the behavior of speed versus excursion time (measured in PCGs), whereupon the mean and standard deviation of the excursion time is determined with and without the implementation of a closed loop power control scheme. Lines 501 and 503 represent the mean and standard deviation of the excursion times, respectively, with the closed loop power control scheme on. Lines 500 and 502 represent the mean and standard deviation of the excursion times, respectively, with the closed loop power control scheme off. FIG. 6 is a graph illustrating the behavior of speed versus the number of zero crossings. Line 600 represent the number of zero crossings that occur at various speeds when the closed loop power control is on, and line 601 represent the number of zero crossings that occur at various speeds when the closed loop power control is off.

It can be observed from FIG. 5 and FIG. 6 that the static case exhibits a large number of zero crossings and a small excursion time. Slow fades are detected in areas of fewer level crossings with larger excursion times. With increasing speeds, the level crossings increase and the excursion times decrease. The exemplary embodiment uses the number of level crossings and excursion times to determine general categories of velocity, and then proceeds to optimize system performance through selective operation of the closed loop power control scheme.

Figure 7:
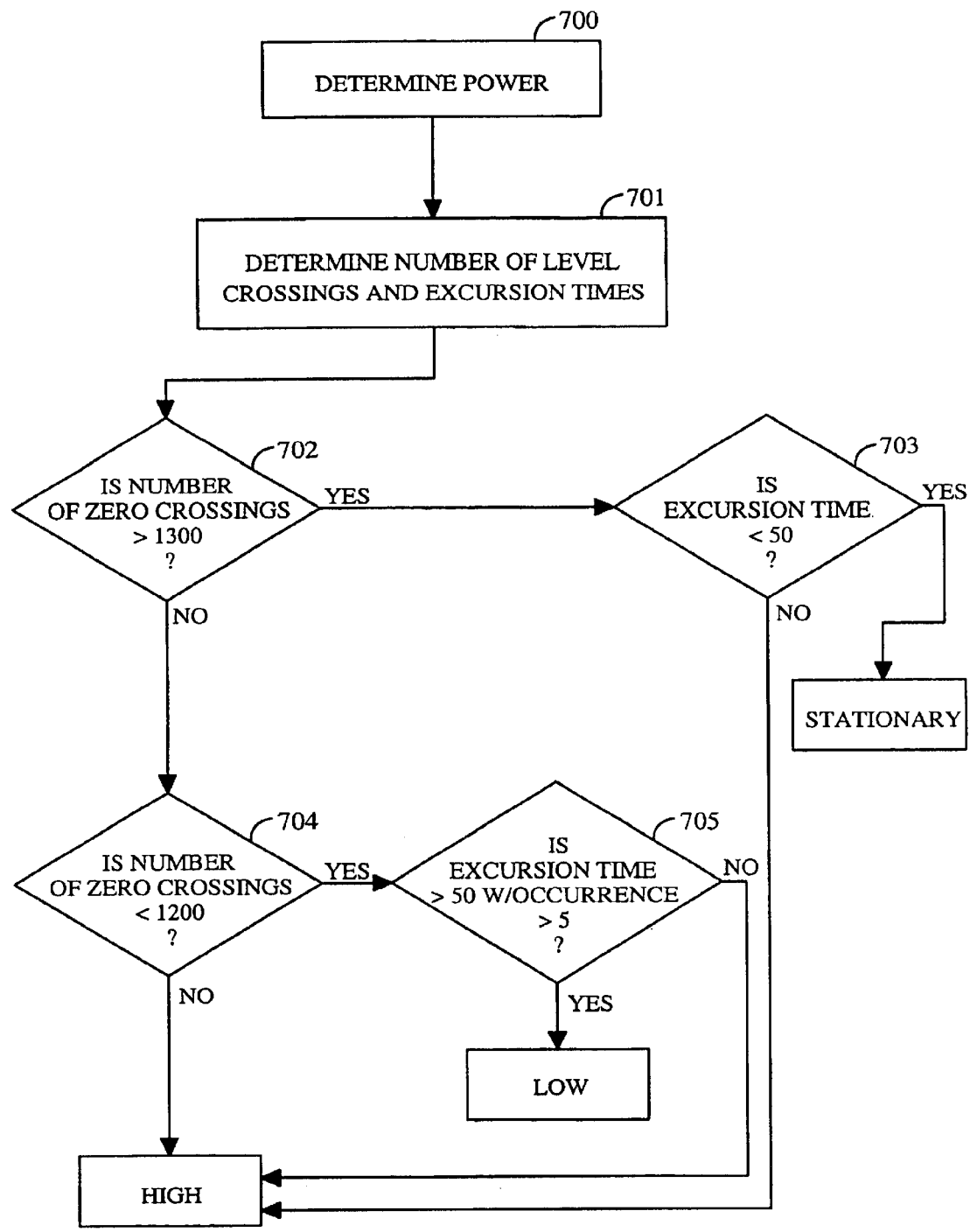
FIG. 7 is a flow chart of a method for determining a velocity classification.

FIG. 7 is a flow chart illustrating a method for determining a velocity classification. At step 700, a determination of average power is made using power control bits. Control flow then proceeds to step 701. At step 701, a number of level crossings and a number of excursion times are determined from the average power determined at step 700. Control flow then proceeds to step 702. At step 702, the number of level crossings is compared to a first threshold value stored in a memory element. If the number of level crossings is less than or equal to the first threshold value, then the process proceeds to step 704. If the number of level crossings is greater than the first threshold value, then the process proceeds to step 703. At step 703, the excursion time is compared to a second threshold value. If the excursion time is less than the second threshold value, then the velocity is classified as "stationary." If the excursion time is greater than or equal to the second threshold value, then the velocity is classified as "high." For illustrative purposes, the first threshold value is set at 1300 and the second threshold value is set at 50 PCGs. However, other values may be used in accordance with the exemplary embodiment.

At step 704, the number of level crossings is compared to a third threshold value. If the number of level crossings is greater than or equal to the third threshold value, then the velocity is classified as "high." If the number of level crossings is less than the third threshold value, then the process proceeds to step 705. At step 705, the excursion time is compared to the second threshold value. If the excursion time is greater than the second threshold value more than an assigned number of times, then the velocity is classified as "low." For illustrative purposes, the third threshold value is set at 1200, and the assigned number of times is five (5), but other values may be used in accordance with the exemplary embodiment.

Figure 8:
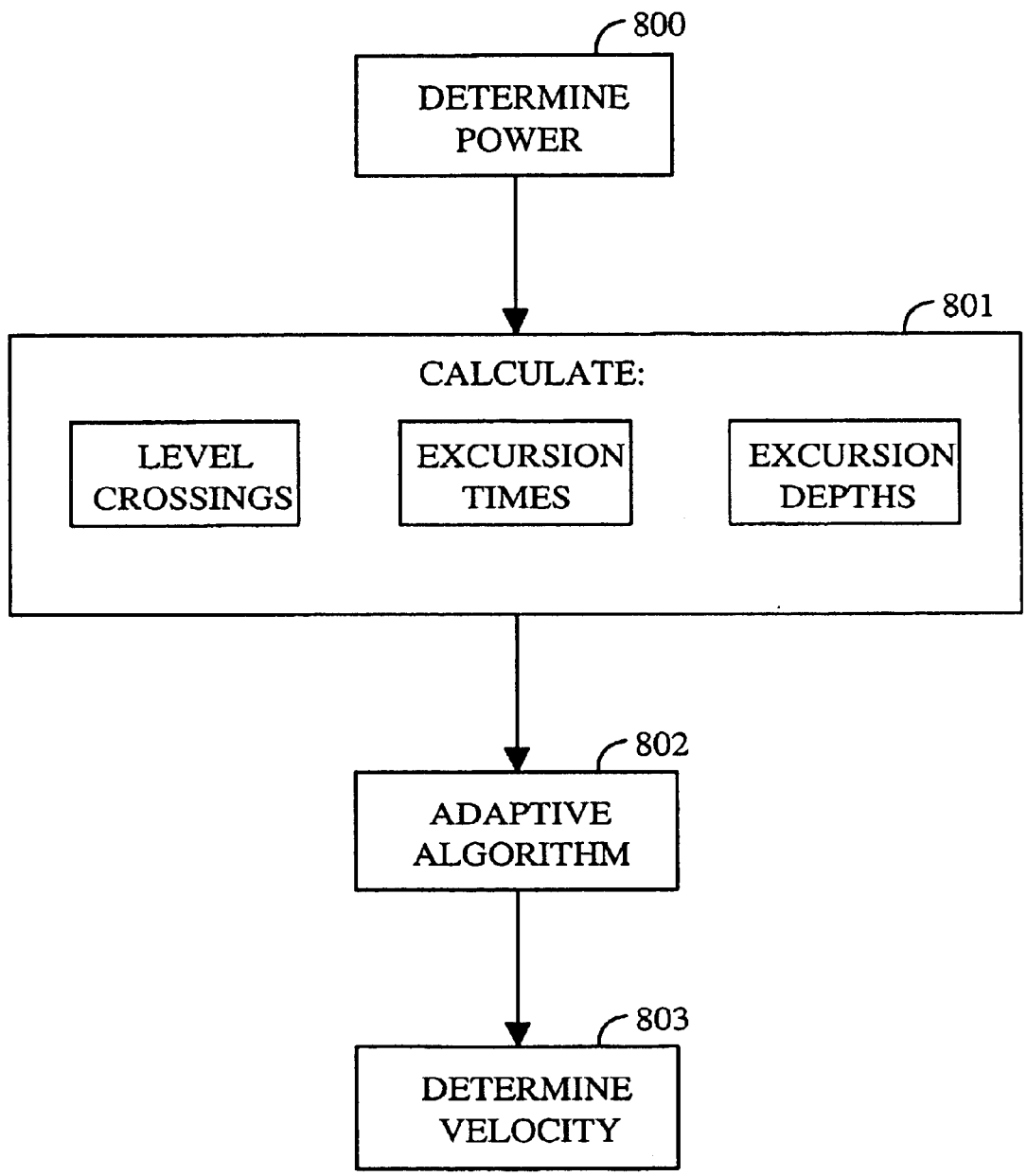
FIG. 8 is a flow chart of an adaptive algorithm for determining a velocity classification.

FIG. 8 is a flow chart illustrating another method for determining a velocity classification that can be used in the exemplary embodiment of the invention, wherein actual observed values of the level crossings, the excursion times and the excursion depths are used as inputs into an adaptive algorithm that predicts velocity. At step 800, a determination of average power is made using power control bits. Control flow then proceeds to step 801. At step 801, a plurality of level crossings, excursion times, and excursion depths are determined from the average power determined at step 800, wherein an excursion depth is the amplitude/gain in dB of a waveform at a specified excursion time. Control flow then proceeds to step 802. At step 802, the values for the number of level crossings, the excursion times and the excursions depths are used by an adaptive algorithm to predict a future velocity value that will be used to optimally adjust the system performance. The adaptive algorithm can use techniques such as Recursive Least Squares (RLS) estimation to use past values of inputs in order to predict future values of the number of level crossings, the excursion times, and the excursion depths. These future values can be used to predict future velocity values at step 803.

In an alternative embodiment, the probability density functions (pdfs) of the number of the level crossings, excursions times, and excursion depths can be additionally determined at step 801, so that the pdfs and the actual values of level crossings, excursion times, and excursion depths are used for input into an adaptive algorithm using Least Mean Squared (LMS) estimation at step 802.

In yet another alternative embodiment, the present and/or future velocity can be determined by using the number of level crossings and the excursion times, without the excursion depths. Techniques such as RLS estimation, LMS estimation, and the derivation of pdfs of random variables are well known in the art and will not be described in detail herein.

Figure 9A:
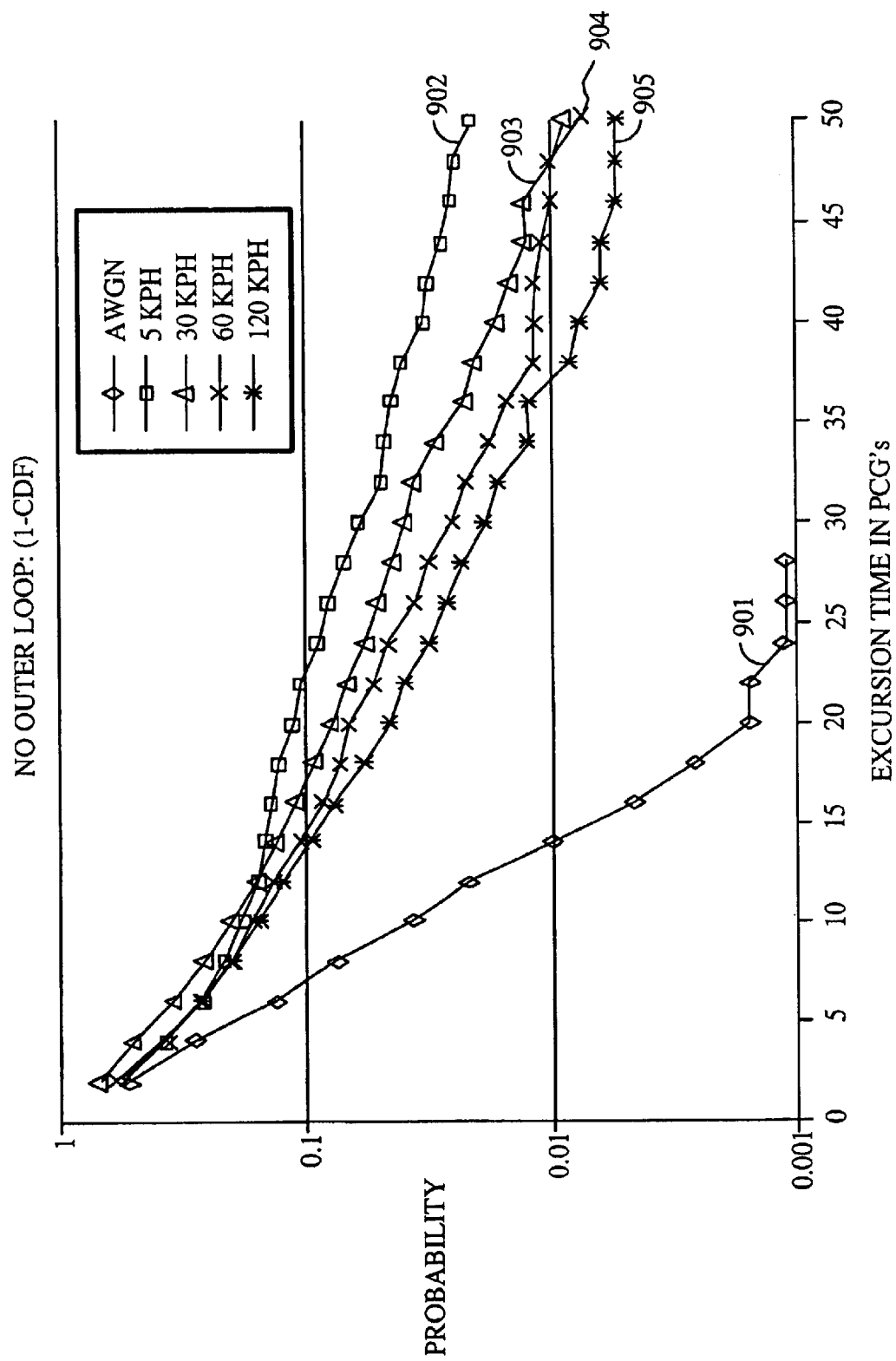
FIG. 9a is an illustrative graph of the error rate associated with the exemplary embodiment.
Figure 9B:
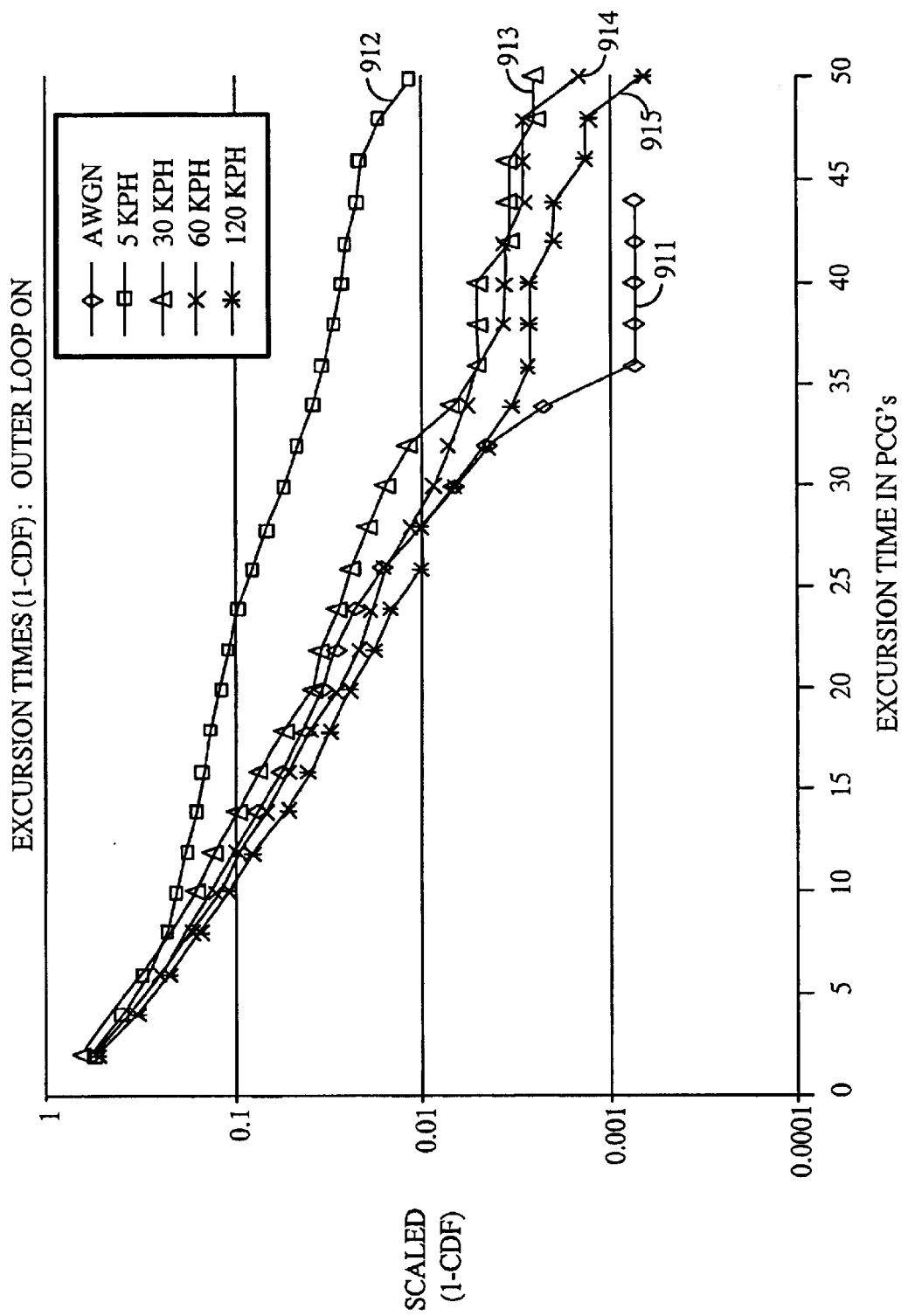
FIG. 9b is an illustrative graph of the error rate associated with the exemplary embodiment.

FIG. 9a and FIG. 9b are graphs that illustrate another perspective of the information shown in FIG. 5, wherein the behavior of excursion times with and without closed loop power control are described at specified speeds. The complementary cumulative distribution functions (cdfs) of the excursion times without an outer loop power control at 0, 5, 30, 60, and 120 km/hour are represented by lines 901, 902, 903, 904, and 905, respectively. The cdfs of the excursion times with outer loop power control at 0, 5, 30, 60, and 120 km/hour are represented by lines 911, 912, 913, 914, and 915, respectively. In general, it can be observed that the error rate will be less than 1% for each speed category, which decreases as the excursion time increases.

Thus, a novel and improved method and apparatus for adaptively controlling the power levels of wireless transmissions have been described. Those of skill in the art would understand that the various illustrative logical blocks, modules, circuits, and algorithm steps described in connection with the embodiments disclosed herein may be implemented as electronic hardware, computer software, or combinations of both. The various illustrative components, blocks, modules, circuits, and steps have been described generally in terms of their functionality. Whether the functionality is implemented as hardware or software depends upon the particular application and design constraints imposed on the overall system. Skilled artisans recognize the interchangeability of hardware and software under these circumstances, and how best to implement the described functionality for each particular application. As examples, the various illustrative logical blocks, modules, circuits, and algorithm steps described in connection with the embodiments disclosed herein may be implemented or performed with a digital signal processor (DSP), an application specific integrated circuit (ASIC), a field programmable gate array (FPGA) or other programmable logic device, discrete gate or transistor logic, discrete hardware components such as, e.g., registers and FIFO, a processor executing a set of firmware instructions, any conventional programmable software module and a processor, or any combination thereof. The processor may advantageously be a microprocessor, but in the alternative, the processor may be any conventional processor, controller, microcontroller, or state machine. The software module could reside in RAM memory, flash memory, ROM memory, EPROM memory, EEPROM memory, registers, hard disk, a removable disk, a CD-ROM, or any other form of storage medium known in the art. Those of skill would further appreciate that the data, instructions, commands, information, signals, bits, symbols, and chips that may be referenced throughout the above description are advantageously represented by voltages, currents, electromagnetic waves, magnetic fields or particles, optical fields or particles, or any combination thereof.

Preferred embodiments of the present invention have thus been shown and described. It would be apparent to one of ordinary skill in the art, however, that numerous alterations may be made to the embodiments herein disclosed without departing from the spirit or scope of the invention. Therefore, the present invention is not to be limited except in accordance with the following claims.

We claim:

1. A method for adaptively controlling reverse link transmission power levels within a wireless communication system, comprising:

determining a mobility profile of a remote station within a communicating range of a base station, wherein the remote station transmits a plurality of signals to the base station at various transmission power levels by using an open loop power control scheme and a closed loop power control scheme, wherein said determining a mobility profile is based on using an average transmission power level associated with a frame of the plurality of signals to determine a level crossing value and an excursion time and using the level crossing value and the excursion time to determine a velocity classification for the remote station; and preventing the closed loop power control scheme if the mobility profile is unfavorable depending on the determined velocity classification for the remote station.

2. The method of claim 1, wherein said using the level crossing value and the excursion time value to determine a velocity classification for the remote station comprises:

(a) comparing the level crossing value to a first threshold value;

(b) if the level crossing value is greater than the first threshold value, then comparing the excursion time value to a second threshold value;
   (i) if the excursion time value is less than the second threshold value, then setting the velocity classification as static, else setting the velocity classification as high speed;

(c) if the level crossing value is less than or equal to the first threshold value, then comparing the level crossing value to a third threshold value;
   (i) if the level crossing value is less than the third threshold value, then performing:
      comparing the excursion time value to the second threshold value; and
      if the excursion time value is greater than the second threshold value, then determining the number of times the excursion time value is greater than the second threshold value in a given period;
      if the number of times the excursion time value is greater than the second threshold value in the given period is more than an assigned number, then setting the velocity classification as low speed, else setting the velocity classification as high speed; and
   (i) if the level crossing value is greater than or equal to the third threshold value, then setting the velocity classification as high speed.

3. The method of claim 1, wherein said preventing the closed loop power control scheme is performed by the base station, wherein the base station ignores closed loop power control requests from the remote station.

4. The method of claim 1, wherein said preventing the closed loop power control scheme is performed by the base station, wherein the base station transmits a command to the remote station to make the closed loop power control scheme ineffectual.

5. The method of claim 1, wherein the mobility profile is unfavorable if the mobility profile indicates a high speed or a static speed.

6. A method for adaptively controlling reverse link transmission power levels within a wireless communication system, comprising:

determining a mobility profile of a remote station within a communicating range of a base station, wherein the remote station transmits a plurality of signals to the base station at various transmission power levels by using an open loop power control scheme and a closed loop power control scheme, wherein said determining the mobility profile of the remote station is based on using a plurality of transmitted power control bits to determine a level crossing value and an excursion time value and using the level crossing value and the excursion time value to determine a velocity classification for the remote station; and preventing the closed loop power control scheme if the mobility profile is unfavorable depending on the determined velocity classification for the remote station.

7. The method of claim 6 wherein said using the level crossing value and the excursion time value to determine a velocity classification for the remote station comprise:

(a) comparing the level crossing value to a first threshold value;

(b) if the level crossing value is greater than the first threshold value, then comparing the excursion time value to a second threshold value;
  (i) if the excursion time value is less than the second threshold value, then setting the velocity classification as static, else setting the velocity classification as high speed;

(c) if the level crossing value is less than or equal to the first threshold value, then comparing the level crossing value to a third threshold value;
  (i) if the level crossing value is less than the third threshold value, then performing:
    comparing the excursion time value to the second threshold value; and
    if the excursion time value is greater than the second threshold value, then determining the number of times the excursion time value is greater than the second threshold value in a given period;
    if the number of times the excursion time value is greater than the second threshold value in the given period is more than an assigned number, then setting the velocity classification as low speed, else setting the velocity classification as high speed; and
  (i) if the level crossing value is greater than or equal to the third threshold value, then setting the velocity classification as high speed.

8. A method for adaptively controlling reverse link transmission power levels within a wireless communication system, comprising:

determining a mobility profile of a remote station within a communicating range of a base station, wherein the remote station transmits a plurality of signals to the base station at various transmission power levels by using an open loop power control scheme and a closed loop power control scheme, wherein said determining the mobility profile of the remote station is based on using a plurality of transmitted power control bits to determine a level crossing value, multiplying the level crossing value, a carrier signal frequency, and a constant to generate a product, and dividing the generated product by the square root of $2\pi$ to generate an approximate velocity value; and preventing the closed loop power control scheme if the mobility profile is unfavorable depending on the generated velocity value for the remote station.

9. A method for adaptively controlling transmission power levels of a remote station, comprising:

determining whether the remote station is stationary, travelling at low speed, or travelling at high speed, wherein said determining is based on determining a plurality of level crossing values, a plurality of excursion time values, and plurality of excursion depth values from a set of power statistics and inputting the plurality of level crossing values, the plurality of excursion time values, and the plurality of excursion depth values into an adaptive algorithm to determine a velocity value, wherein the adaptive algorithm uses a Recursive Least Squares (RLS) estimation process and the velocity value indicates whether the remote station is stationary, travelling at low speed, or travelling at high speed; and refraining from implementing a closed loop power control scheme if the remote station is stationary or travelling at high speed, wherein the closed loop power control scheme is used to adjust an open loop power control scheme.

10. A method for adaptively controlling transmission power levels of a remote station, comprising:

determining whether the remote station is stationary, travelling at low speed, or travelling at high speed, wherein said determining is based on determining a plurality of level crossing values, a plurality of excursion time values, and a plurality of excursion depth values from a set of power statistics and inputting the plurality of level crossing values, the plurality of excursion time values, and the plurality of excursion depth values into an adaptive algorithm to determine a future velocity value, wherein the adaptive algorithm uses a Recursive Least Squares (RLS) estimation process and the future velocity value indicates whether the remote station will be stationary, travelling at low speed, or travelling at high speed; and refraining from implementing a closed loop power control scheme if the remote station is stationary or travelling at high speed, wherein the closed loop power control scheme is used to adjust an open loop power control scheme.

11. A method for adaptively controlling transmission power levels of a remote station, comprising:

determining whether the remote station is stationary, travelling at low speed, or travelling at high speed, wherein said determining is based on determining a first probability density function (PDF) associated with a plurality of level crossing values, a second PDF associated with a plurality of excursion time values, and a third PDF associated with a plurality of excursion depth values from a set of power statistics and inputting the first PDF, the second PDF, the third PDF, the plurality of level crossing values, the plurality of excursion time values, and the plurality of excursion depth values into an adaptive algorithm to determine a velocity value, wherein the adaptive algorithm uses a Least Mean-Squared (LMS) estimation process and the velocity value indicates whether the remote station is stationary, travelling at low speed, or travelling at high speed; and refraining from implementing a closed loop power control scheme if the remote station is stationary or travelling at high speed, wherein the closed loop power control scheme is used to adjust an open loop power control scheme.

12. An apparatus for adaptively controlling reverse link transmission power levels within a wireless communication system, comprising:

means for determining a mobility profile of a remote station within a communicating range of a base station, wherein the remote station transmits a plurality of signals to the base station at various transmission power levels by using an open loop power control scheme and a closed loop power control scheme, wherein said determining a mobility profile is based on using an average transmission power level associated with a frame of the plurality of signals to determine a level crossing value and an excursion time and using the level crossing value and the excursion time to determine a velocity classification for the remote station; and means for preventing the closed loop power control scheme if the mobility profile is unfavorable depending on the determined velocity classification for the remote station.

13. An apparatus for adaptively controlling reverse link transmission power levels within a wireless communication system, comprising:

means for determining a mobility profile of a remote station within a communicating range of a base station, wherein the remote station transmits a plurality of signals to the base station at various transmission power levels by using an open loop power control scheme and a closed loop power control scheme, wherein said determining the mobility profile of the remote station is based on using a plurality of transmitted power control bits to determine a level crossing value and an excursion time value and using the level crossing value and the excursion time value to determine a velocity classification for the remote station; and means for preventing the closed loop power control scheme if the mobility profile is unfavorable depending on the determined velocity classification for the remote station.

14. An apparatus for adaptively controlling reverse link transmission power levels within a wireless communication system, comprising:

means for determining a mobility profile of a remote station within a communicating range of a base station, wherein the remote station transmits a plurality of signals to the base station at various transmission power levels by using an open loop power control scheme and a closed loop power control scheme, wherein said determining the mobility profile of the remote station is based on using a plurality of transmitted power control bits to determine a level crossing value, multiplying the level crossing value, a carrier signal frequency, and a constant to generate a product, and dividing the generated product by the square root of $2\pi$ to generate an approximate velocity value; and means for preventing the closed loop power control scheme if the mobility profile is unfavorable depending on the generated velocity value for the remote station.

* * * * *